Nov. 14, 1967     H. J. FLAIR     3,352,563
SELF-ADJUSTING TENSION TYPE, LOW FRICTION SEAL
Filed July 12, 1965
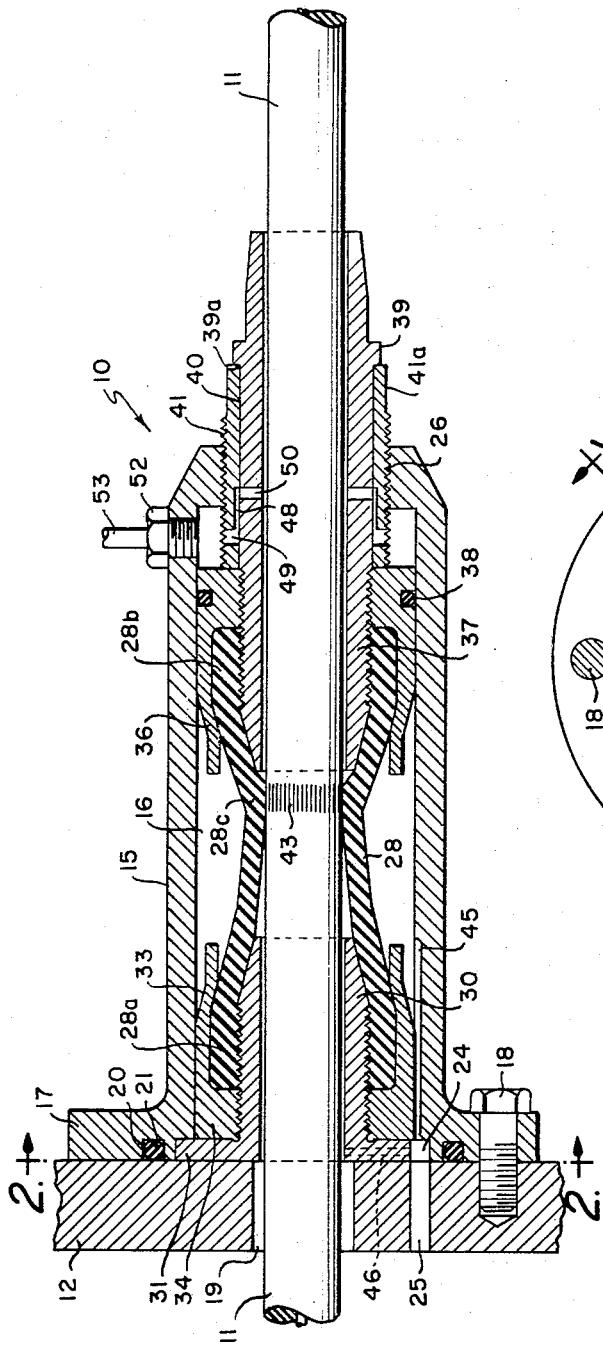
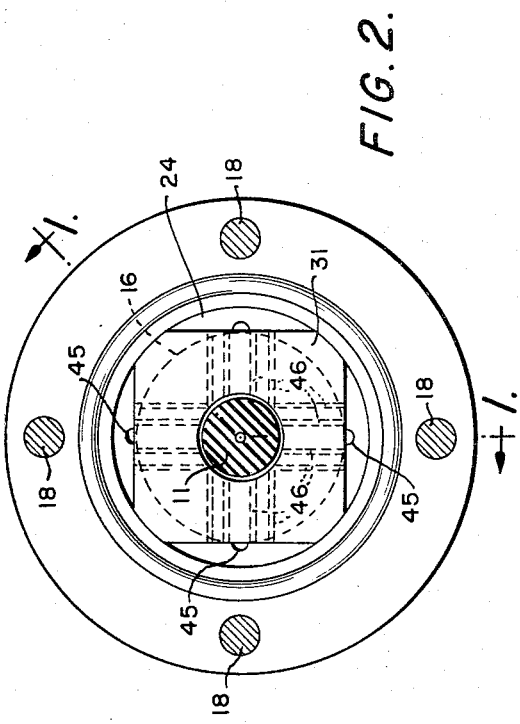
INVENTOR.
HENRY J. FLAIR
BY *J. E. Hodges*
*Harvey A. David*
ATTYS.

United States Patent Office 3,352,563
Patented Nov. 14, 1967

3,352,563
SELF-ADJUSTING TENSION TYPE, LOW FRICTION SEAL
Henry J. Flair, Franklin Park, Ill., assignor, by mesne assignments, to the United States of America as represented by the Secretary of the Navy
Filed July 12, 1965, Ser. No. 471,482
3 Claims. (Cl. 277—27)

ABSTRACT OF THE DISCLOSURE

A seal for allowing passage of a rod or cable through a pressure hull in which the rod or cable is surrounded by an elastomeric sleeve which is stretched to form an annular zone of sealing around the rod. The pressure between the internal and external surfaces of the sleeve is equalized on one side of the sealing zone.

---

This invention relates to shaft or cable seals and more particularly to an improved seal suitable for preventing water from entering the pressure hull of a submarine around a cable which is transferable outwardly and inwardly of the hull through the seal.

It is one important object of the invention to provide a through hull cable seal which is operative when used as a seal for a cable passing through a submarine hull to exclude the entry of water around the cable under a wide range of sea pressure conditions experienced by the submarine.

Another important object of the invention is the provision of a seal which offers a minimum resistance to movement of the cable or the like therethrough during transfer of the cable either outwardly or inwardly of the hull.

Still another object of the invention is the provision of an improved cable seal which is capable of accommodating variations or irregularities in cable diameter and roundness without attention and while performing its sealing functions.

As another object of this invention aims to accomplish the foregoing through the provision of a novel seal construction including an elastomeric sleeve or tube which is axially stretched to reduced the inside diameter of a central portion thereof so as to create an annular zone of sealing engagement with a cable therein, the seal comprising means for balancing pressures acting on said sleeve to one side of the zone of sealing engagement.

Other objects, advantages and novel features of the invention will become apparent from the following detailed description of the invention when considered in conjunction with the accompanying drawings wherein:

FIG. 1 is a longitudinal sectional view of a cable seal embodying the invention taken substantially along line 1—1 of FIG. 2; and FIG. 2 is a view of the seal of FIG. 1 taken substantially along line 2—2 thereof.

In the form of the invention illustrated in the drawings and described hereinafter, there is provided an improved seal generally indicated at 10 for providing watertight integrity around a cylindrical member such as a submarine antenna cable 11 which is axially movable for transfer through a hull member or wall 12 to the left of which occur relatively high sea pressures and to the right of which is zero or atmospheric pressure.

The seal 10 comprises, in this example, an elongated body 15 formed of a suitable rigid material such as stainless steel and having a central bore 16. One end of the body 15 is provided with a flange 17 through which screws 18 extend for securing of the seal 10 to the hull wall 12 with the bore 16 in alignment with a cable receiving aperture 19 in the wall. An annular groove 20 in the flange 17 contains an O ring 21 for making a fluidtight union between the body 15 and the wall 12.

The flanged end of the body is counterbored at 24, the counterbore overlying a sea pressure transmitting passage 25 through the wall 12 for a purpose which will become apparent as the description proceeds. The end of the body 15 remote from the flange 17 is provided with a reduced opening leading to the bore 16 and provided with internal threads 26.

Disposed within the bore 16 and in surrounding relation to the cable 11 is an elastomeric tube or sleeve 28. The sleeve 28, when relaxed, may have an inside diameter slightly larger than the outside diameter of the cable 11. The end 28a of the sleeve 28 adjacent the flanged end of the body 15 is secured to the body by anchor means comprising an externally threaded tubular member 30 having a flange portion 31 received in the counterbore 24. As is best illustrated in FIG. 2 the flange portion 31 is generally square with the corners thereof adapted to be clamped between the body 15 and the wall 12.

A collar or ferrule 33 has an internally threaded end portion 34 engaged on the external threads of the tubular member 30, with the end 28a of the sleeve 28 tightly gripped between the ferrule and tubular member.

The other end 28b of the sleeve 28 is tightly gripped between a ferrule 36 and an externally threaded tubular member 37. The ferrule 36, which is threadedly engaged on the tubular member 37, is provided with an external annular groove containing an O-ring 38 bearing against the inner surface of the bore 16. The internal diameters of the tubular members 30 and 37 are each of a sufficient size to freely pass the cable 11.

The tubular member 37, which surrounds the cable 11 and extends freely through the internal threads 26 of the body 15, is provided with a flange 39 presenting an axially facing annular shoulder 39a spaced from the ferrule 36. Between the ferrule 36 and the shoulder 39a, the tubular member 37 presents a cylindrical surface 40 on which is rotatably mounted an externally threaded, tubular adjustment screw member 41. The member 41 is threadedly engaged with the internal threads 26 of the body 15, and the exposed end of the member 41 engaging the shoulder 39a is provided with hexagonally arranged flats 41a for receiving an adjusting wrench. The flange 39 is itself provided with suitable flats for receiving a wrench to prevent turning of the tubular member 37 upon rotation of the adjusting screw member 41.

The latter may be rotated to cause the tubular member 37 and ferrule 36 to be moved to the right as viewed in FIG. 1 so as to axially stretch the elastomeric sleeve 28. Such stretching of the sleeve 28 causes the central portion 28c thereof to constrict and reduce the inside diameter of the sleeve, producing a zone of contact 43 with the cable 11. The stretched and constricted mid-portion 28c of the elastomeric sleeve 28 will thereby exert hoop tension about the cable 11 which may be finely adjusted by use of the adjusting screw member 41. The presence of this hoop tension of the elastomeric sleeve 28 causes it to provide an effective seal against ingress of water about the cable 11, and further causes the contacting zone 43 of the sleeve to conform itself to variations in size or roundness of the cable.

Because the contacting pressure can be finely adjusted, and because the actual contact is limited to a narrow band or zone 43, the frictional drag opposing movement of the cable through the seal 10 is minimized.

The invention contemplates the maintenance of an effective seal while avoiding either leakage or undue increase in frictional resistance to cable movement throughout wide ranges of sea pressure. To this end, the body 15 is provided with axial grooves 45 for conducting sea pressure past the ferrule 33 from the passage 25 in the hull wall 12 to the portion of the bore 16 around the mid-portion 28c of the sleeve 28. Also, the flange portion 31 of the tubular member 30 is provided with a plurality of passages 46 communicating between the counterbore 24 and the interior of that tubular member. Inasmuch as the tubular member 30 has an inside diameter which loosely passes the cable 11, sea pressure is transmitted along the interior of the sleeve 28 to, but not into, the zone of sealing contact and substantially balances the sea pressure acting on the exterior of the sleeve mid-portion. Accordingly, the seal is effectively maintained by the hoop tension in the sleeve mid-portion alone, and the frictional drag opposing movement of the cable 11 is maintained at acceptable values throughout a wide range of pressure conditions.

In order to further reduce frictional resistance to cable movement, the seal 10 is advantageously designed to provide a supply of lubricant to the cable surface. This is accomplished by providing an annular relieved area 48 in the internal surface of the adjusting screw member 41, and passages 49 and 50 in the screw member and tubular member 37, respectively communicating with the bore 16 and interior of that tubular member.

A suitable fitting 52 is threaded into an opening in the body 15 and provides connection between low pressure fluid lubricant supply line 53 and that portion of bore 16 lying between the ferrule 36 and the threaded end of the body. Lubricant follows the passages 49, recess 48, and passages 50 to spread upon the surface of the cable 11.

From the foregoing detailed description of an exemplary seal 10 embodying the invention it will be recognized that the previously stated objects and advantages, as well as others apparent from the description, have been satisfied by the invention.

Although the invention has been described in considerable detail with reference to a specific seal 10 embodying the invention, it will be understood that the invention is not limited thereto, but rather the invention includes all those modifications, substitutions, adaptations and uses as are reasonably embraced by the scope of the claims hereof.

What is claimed is:
1. A seal device comprising:
 a body having a bore;
 an elastomeric sleeve disposed in said bore;
 anchoring means securing one end of said sleeve against movement within said bore;
 a tubular member having an inside diameter sufficient to pass an elongated cylindrical member movable axially through said sleeve;
 a ferrule clamping the other end of said sleeve to one end of said tubular member, said ferrule providing fluidtight relation between said other end of said sleeve and said body;
 said tubular member presenting an axially facing annular shoulder spaced from said ferrule;
 a hollow externally threaded adjustment screw rotatably mounted on said tubular member between said ferrule and said shoulder, said screw being threadedly engaged with said body whereby rotation of said screw will effect axial movement of said tubular member and ferrule to adjustably stretch said sleeve into constrictive engagement of the mid-portion thereof with a cylindrical member passing therethrough; and
 said body and said anchoring means defining fluid passage means for subjecting the internal and external surfaces of said sleeve on one side of said constrictive engagement to like fluid pressures.

2. A sealing device as defined in claim 1 and comprising an O-ring acting between said ferrule and said body to effect said fluidtight relation between said other end of said sleeve and said body.

3. A sealing device as defined in claim 1 and wherein said anchoring means comprises a tubular member having a flange disposed in a counterbore of said body.

References Cited
UNITED STATES PATENTS 2,446,620    8/1948    Swallow et al. _____ 277—3 X
3,063,725    11/1962    Frey _____ 277—4

SAMUEL ROTHBERG, *Primary Examiner.*